United States Patent
Lapstun et al.

(10) Patent No.: US 7,400,937 B2
(45) Date of Patent: *Jul. 15, 2008

(54) MP3 PLAYER WITH CODE SENSOR

(75) Inventors: Paul Lapstun, Balmain (AU); Tobin Allen King, Balmain (AU); Simon Robert Walmsley, Balmain (AU); Kia Silverbrook, Balmain (AU)

(73) Assignee: Silverbrook Research Pty Ltd, Balmain, New South Wales (AU)

( * ) Notice: Subject to any disclaimer, the term of this patent is extended or adjusted under 35 U.S.C. 154(b) by 0 days.

This patent is subject to a terminal disclaimer.

(21) Appl. No.: 10/917,467

(22) Filed: Aug. 13, 2004

(65) Prior Publication Data

US 2005/0021161 A1    Jan. 27, 2005

Related U.S. Application Data

(63) Continuation of application No. 09/722,087, filed on Nov. 25, 2000, now Pat. No. 6,788,982.

(30) Foreign Application Priority Data

Dec. 1, 1999   (AU) .................................. PQ4392

(51) Int. Cl.
*G06F 17/00* (2006.01)
*G06F 17/30* (2006.01)
*H04H 40/00* (2008.01)

(52) U.S. Cl. ............................. 700/94; 707/1; 455/3.06

(58) Field of Classification Search .................... 700/94; 726/27, 29, 30; 455/3.06; 707/1
See application file for complete search history.

(56) References Cited

U.S. PATENT DOCUMENTS

| | | | |
|---|---|---|---|
| 4,604,065 A | * | 8/1986 | Frazer et al. ................. 434/331 |
| 4,864,618 A | | 9/1989 | Wright et al. |
| 5,051,736 A | | 9/1991 | Bennett et al. |
| 5,477,012 A | | 12/1995 | Sekendur |
| 5,652,412 A | | 7/1997 | Lazzouni et al. |
| 5,661,506 A | | 8/1997 | Lazzouni |
| 6,692,073 B1 | | 11/1997 | Cass |
| 5,852,434 A | | 12/1998 | Sekendur |

(Continued)

FOREIGN PATENT DOCUMENTS

EP       0817139 A       1/1998

(Continued)

OTHER PUBLICATIONS

Dymetman, M., and Copperman, M., Intellgent Paper, in Electronic Publishing, Artistic Imaging, and Digital Typography, Proceedings of EP'98, Mar./Apr. 1998, Springer Verlag LNCS 1375, pp. 342-406.

*Primary Examiner*—Sinh Tran
*Assistant Examiner*—Daniel R Sellers

(57) ABSTRACT

An MP3 player (10) is provided with an image sensor (16) capable of imaging invisible infrared tags (78) on a substrate (70). The tags (78) encode identity data which is directly or indirectly associated in a computer system with one or more audio clips in an MP3 format.

The MP3 player (10) can be used to select and play audio clips. It acquires tag identity data via the image sensor (16), transmits it to the computer system, and downloads associated MP3 clip(s) for playback via a speaker (22).

14 Claims, 13 Drawing Sheets

U.S. PATENT DOCUMENTS

| | | | |
|---|---|---|---|
| 5,874,722 A * | 2/1999 | Rando et al. ............ 235/472.01 |
| 5,894,119 A * | 4/1999 | Tognazzini .................. 235/375 |
| 5,905,251 A | 5/1999 | Knowles |
| 5,995,105 A | 11/1999 | Reber et al. |
| 5,999,570 A * | 12/1999 | Chaki .......................... 375/281 |
| 6,076,734 A | 6/2000 | Dougherty et al. |
| 6,094,279 A * | 7/2000 | Soscia ......................... 358/1.9 |
| 6,170,060 B1 * | 1/2001 | Mott et al. ................... 713/201 |
| 6,215,754 B1 * | 4/2001 | Vidal et al. .................... 369/84 |
| 6,229,964 B1 * | 5/2001 | Bell ............................ 396/310 |
| 6,290,134 B1 | 9/2001 | Rando et al. |
| 6,332,175 B1 * | 12/2001 | Birrell et al. ................. 711/112 |
| 6,460,155 B1 * | 10/2002 | Nagasaki et al. ............. 714/752 |
| 6,486,875 B1 | 11/2002 | O'Donnell, Jr. |
| 6,498,604 B1 | 12/2002 | Jensen |
| 6,964,374 B1 | 11/2005 | Djuknic et al. |
| 2002/0059147 A1 * | 5/2002 | Ogasawara .................. 705/70 |
| 2002/0072818 A1 | 6/2002 | Moon et al. |
| 2003/0176937 A1 | 9/2003 | Janky et al. |

FOREIGN PATENT DOCUMENTS

| | | |
|---|---|---|
| GB | 2306669 | 5/1997 |
| WO | WO 99/18487 | 4/1999 |
| WO | WO 99/19823 A | 4/1999 |
| WO | WO 99/50767 | 10/1999 |

* cited by examiner

MP3 PLAYER WITH CODE SENSOR

CROSS REFERENCE TO RELATED APPLICATION

The present application is a Continuation of U.S. application Ser. No. 09/722,087 filed on Nov. 25, 2000, now issued as U.S. Pat. No. 6,788,982, the entire contents of which are herein incorporated by reference.

FIELD OF INVENTION

The present invention relates to devices for receiving machine-readable input and for outputting a human discernable output, usually in the form of audio or visual information. More particularly the invention relates to an audio player which may be used to scan or sense machine-readable coded data on a surface and to output audio material in response to the sensed coded data.

CO-PENDING APPLICATIONS

Various methods, systems and apparatus relating to the present invention are disclosed in the following co-pending applications/granted patents filed by the applicant or assignee of the present invention simultaneously with the present invention:
U.S. Pat. No. 6,530,339 U.S. Pat. No. 6,631,897 U.S. Ser. No. 09/721,895 U.S. Ser. No. 09/722,174 U.S. Ser. No. 09/721,896 U.S. Pat. No. 7,064,851
U.S. Pat. No. 6,826,547 U.S. Pat. No. 6,927,871 U.S. Pat. No. 6,980,306 U.S. Pat. No. 6,965,439 U.S. Pat. No. 6,788,982 U.S. Ser. No. 09/722,141
U.S. Pat. No. 6,788,293 U.S. Pat. No. 6,946,672 U.S. Pat. No. 7,091,960 U.S. Pat. No. 6,792,165 U.S. Pat. No. 7,105,753 U.S. Ser. No. 09/721,862
U.S. Pat. No. 6,712,452

The disclosures of these co-pending applications are incorporated herein by cross-reference.

Various methods, systems and apparatus relating to the present invention are disclosed in the following co-pending applications/granted patents filed by the applicant or assignee of the present invention on Oct. 20, 2000:
U.S. Ser. No. 09/693,415 U.S. Pat. No. 7,110,126 U.S. Pat. No. 6,813,558 U.S. Pat. No. 6,965,454 U.S. Pat. No. 6,847,883 U.S. Pat. No. 7,131,058
U.S. Ser. No. 09/693,690 U.S. Pat. No. 6,982,798 U.S. Pat. No. 6,474,888 U.S. Pat. No. 6,627,870 U.S. Pat. No. 6,724,374 U.S. Ser. No. 09/693,514
U.S. Pat. No. 6,454,482 U.S. Pat. No. 6,808,330 U.S. Pat. No. 6,527,365 U.S. Pat. No. 6,474,773 U.S. Pat. No. 6,550,997

The disclosures of these co-pending applications are incorporated herein by reference.

Various methods, systems and apparatus relating to the present invention are disclosed in the following co-pending applications/granted patents filed by the applicant or assignee of the present invention on Sep. 15, 2000:
U.S. Pat. No. 6,679,420 U.S. Pat. No. 6,963,845 U.S. Pat. No. 6,995,859 U.S. Pat. No. 6,720,985

The disclosures of these co-pending applications are incorporated herein by reference.

Various methods, systems and apparatus relating to the present invention are disclosed in the following co-pending applications/granted patents filed by the applicant or assignee of the present invention on Jun. 30, 2000:
U.S. Pat. No. 6,824,044 U.S. Pat. No. 6,678,499 U.S. Pat. No. 6,976,220 U.S. Pat. No. 6,976,035 U.S. Pat. No. 6,766,942 U.S. Ser. No. 09/609,303
U.S. Pat. No. 6,922,779 U.S. Pat. No. 6,978,019 U.S. Ser. No. 09/607,843 U.S. Pat. No. 6,959,298 U.S. Pat. No. 6,973,450 U.S. Ser. No. 09/609,553
U.S. Pat. No. 6,965,882 U.S. Ser. No. 09/608,022 U.S. Pat. No. 7,007,851 U.S. Pat. No. 6,957,921 U.S. Pat. No. 6,457,883 U.S. Pat. No. 6,831,682
U.S. Pat. No. 6,977,751 U.S. Pat. No. 6,398,332 U.S. Pat. No. 6,394,573 U.S. Pat. No. 6,622,923

The disclosures of these co-pending applications are incorporated herein by cross-reference.

Various methods, systems and apparatus relating to the present invention are disclosed in the following co-pending applications/granted patents filed by the applicant or assignee of the present invention on 23 May 2000:
U.S. Pat. No. 6,428,133 U.S. Pat. No. 6,526,658 U.S. Pat. No. 6,315,399 U.S. Pat. No. 6,338,548 U.S. Pat. No. 6,540,319 U.S. Pat. No. 6,328,431
U.S. Pat. No. 6,328,425 U.S. Pat. No. 6,991,320 U.S. Pat. No. 6,383,833 U.S. Pat. No. 6,464,332 U.S. Pat. No. 6,390,591 U.S. Pat. No. 7,018,016
U.S. Pat. No. 6,328,417 U.S. Ser. No. 09/575,197 U.S. Pat. No. 7,079,712 U.S. Ser. No. 09/575,123 U.S. Pat. No. 6,825,945 U.S. Ser. No. 09/575,165
U.S. Pat. No. 6,813,039 U.S. Pat. No. 6,987,506 U.S. Pat. No. 7,038,797 U.S. Pat. No. 6,980,318 U.S. Pat. No. 6,816,274 U.S. Pat. No. 7,102,772
U.S. Ser. No. 09/575,186 U.S. Pat. No. 6,681,045 U.S. Pat. No. 6,728,000 U.S. Ser. No. 09/575,145 U.S. Pat. No. 7,088,459 U.S. Ser. No. 09/575,181
U.S. Pat. No. 7,068,382 U.S. Pat. No. 7,062,651 U.S. Pat. No. 6,789,194 U.S. Pat. No. 6,789,191 U.S. Pat. No. 6,644,642 U.S. Pat. No. 6,502,614
U.S. Pat. No. 6,622,999 U.S. Pat. No. 6,669,385 U.S. Pat. No. 6,549,935 U.S. Pat. No. 6,987,573 U.S. Pat. No. 6,727,996 U.S. Pat. No. 6,591,884
U.S. Pat. No. 6,439,706 U.S. Pat. No. 6,760,119 U.S. Ser. No. 09/575,198 U.S. Pat. No. 6,290,349 U.S. Pat. No. 6,428,155 U.S. Pat. No. 6,785,016
U.S. Pat. No. 6,870,966 U.S. Pat. No. 6,822,639 U.S. Pat. No. 6,737,591 U.S. Pat. No. 7,055,739 U.S. Ser. No. 09/575,129 U.S. Pat. No. 6,830,196
U.S. Pat. No. 6,832,717 U.S. Pat. No. 6,957,768 U.S. Ser. No. 09/575,162 U.S. Ser. No. 09/575,172 U.S. Ser. No. 09/575,170 U.S. Pat. No. 7,106,888
U.S. Pat. No. 7,123,239 U.S. Pat. No. 6,409,323 U.S. Pat. No. 6,281,912 U.S. Pat. No. 6,604,810 U.S. Pat. No. 6,318,920 U.S. Pat. No. 6,488,422
U.S. Pat. No. 6,795,215 U.S. Ser. No. 09/575,109 U.S. Pat. No. 6,859,289

The disclosures of these co-pending applications are incorporated herein by cross-reference.

BACKGROUND

Purpose-specific devices such as radios and audio cassette players, as well as more general-purpose devices such as personal computers and organizers, can be used to play back audio material such as music. Many of these devices can also be used to record audio material, such as voice dictation.

In general, these devices don't provide access to situated audio, e.g. to a music clip associated with a concert poster encountered at a train station, or spoken instructions associated with a page in a workshop manual. Each device must be used to seek out the desired audio material through a virtual space accessible through the device, or the audio material must be brought to the device in a device-compatible physical format.

The present invention utilizes methods, systems and devices related to a system referred to as "netpage", which is described in our co-pending applications listed above.

SUMMARY OF INVENTION

In one broad form the invention provides a hand-held audio player with a sensor device capable of sensing coded data. Images including coded data are sensed by the audio player and decoded. The decoded information is transmitted to a computer system which identifies one or more files stored on the system associated with the decoded data, using previously stored association data. The file or files identified are transmitted to the audio player for immediate playback or later playback under user control, either via a built-in loudspeaker or via headphones or similar.

Accordingly, in one broad form, the invention provides an audio player for download and playback of audio files, the audio player including: at least one sensor device capable of sensing images including coded data; a decoder for extracting data from sensed image data; a transceiver for transmitting the decoded data to a computer system and for receiving one or more audio files associated with the decoded data from the computer system; and at least one audio output device for outputting an audio signal corresponding to the audio file.

In another broad form the invention provides a method of downloading files, the method including: providing a plurality of files; associating each of the plurality with one or more identities; providing a user interface displaying at least one selection data, the or each selection data associated with or encoding at least one identity; selecting the or one of the selection data displayed on or by the user interface with a selection device; determining the identity or identities associated with the selection data and identifying the file or files associated with the identity or identities determined from the selection data; and downloading the file or files so identified to the selection device.

The audio player preferably has a memory and a screen for displaying information relating to any files stored in the memory.

The user interface is preferably a piece of paper and preferably the images including code are invisible, infrared absorptive tags. Other forms of display are possible, such as a screen or substrates carrying electronically addressable ink, such as E-Ink produced by E-Ink Corporation.

The audio player may communicate with the computer system via wireless or wired means, or by a combination of both.

The audio player may operate out-of-range of a netpage base station if it is configured to utilize an embedded mobile telephone transceiver, or if it is itself embedded in a mobile telephone which it is configured to interoperate with.

Each selection on the user interface may be associated with one or more files, for instance, a single track or an "album" of many tracks.

Preferably the audio player has a unique identity encoded in the audio player, to enable identification of the audio player and/or a user requesting downloads. If downloaded files are stored in memory the audio player identity may also be stored within or in association with stored files. Playback of stored files may be limited to the original audio player or audio players owned by the same owner. This validation may occur within the audio player or by transmitting information to the computer system.

Memory provided for storage of downloaded files may be fixed in the audio player or removable or some may be fixed and some removable.

DETAILED DESCRIPTION OF PREFERRED AND OTHER EMBODIMENTS

Figure 1:
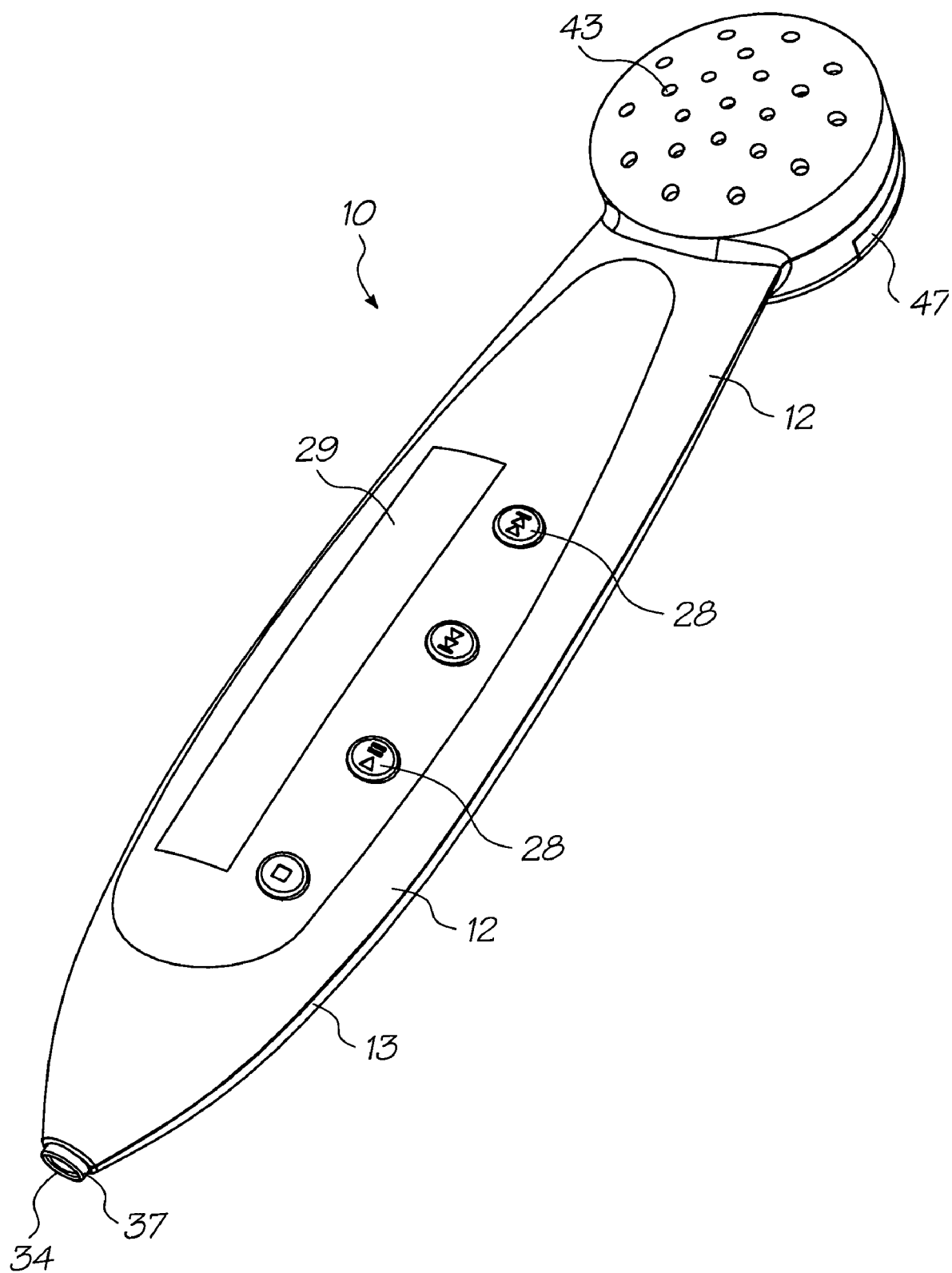
FIG. 1 shows a front perspective view from below of an audio player according to a first embodiment of the invention.
Figure 2:
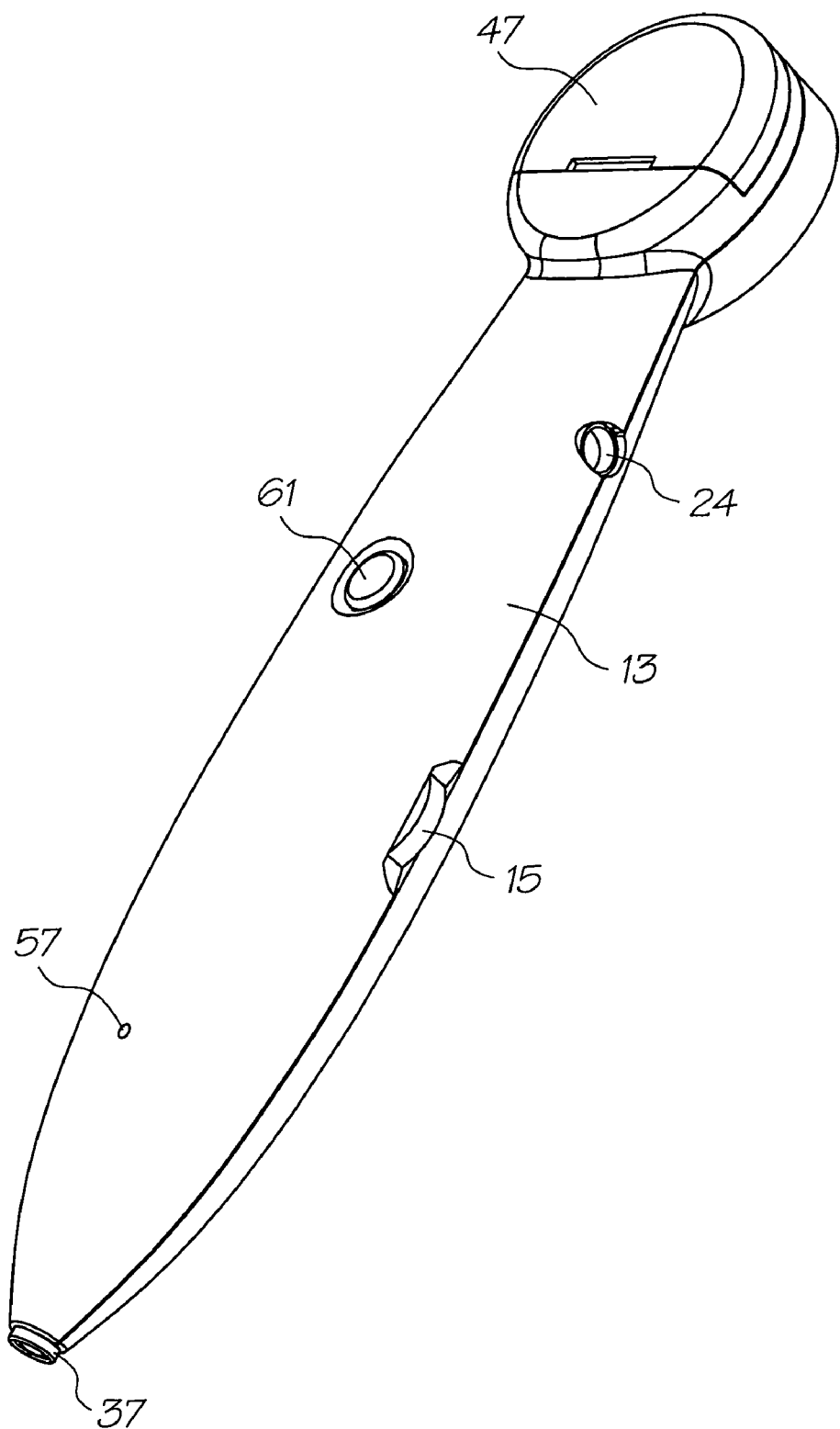
FIG. 2 shows a rear perspective view from below of the audio player of FIG. 1.
Figure 3:
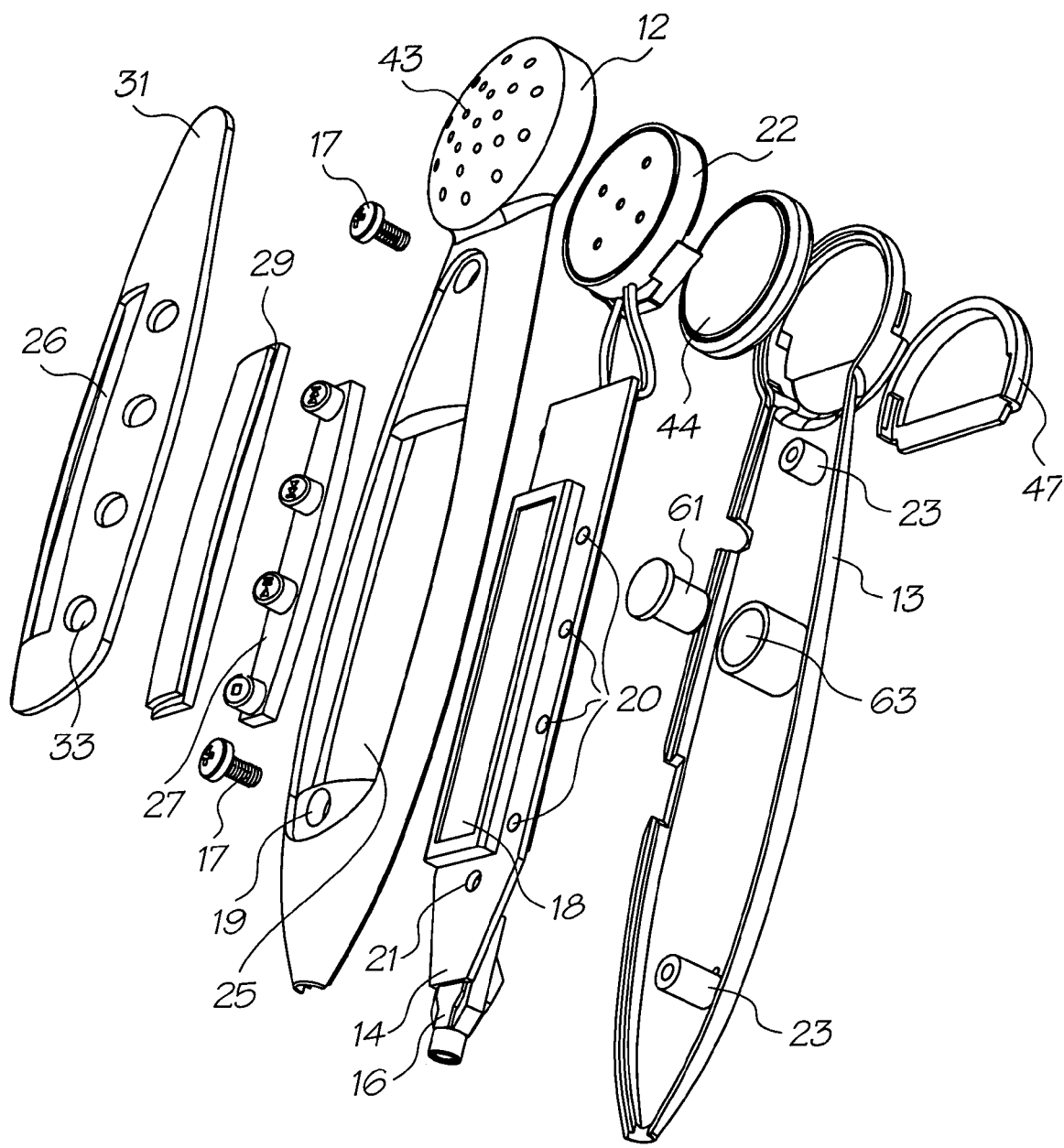
FIG. 3 shows a front exploded perspective view from above of the audio player.
Figure 4:
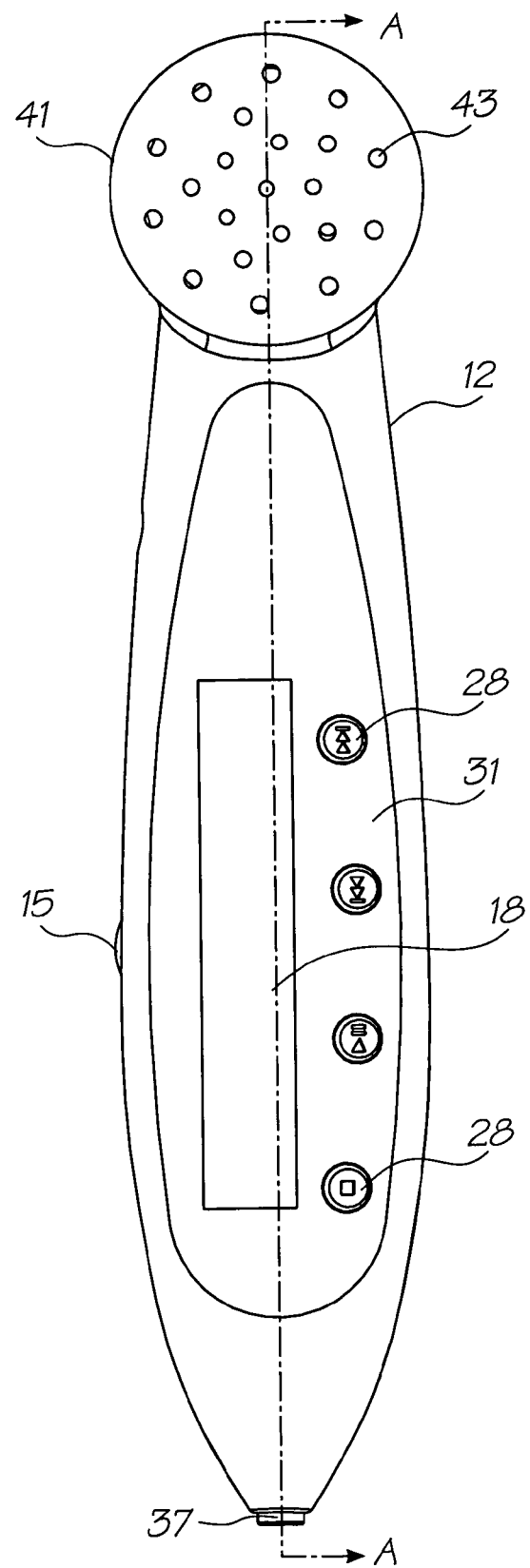
FIG. 4 shows a plan view from above of the audio player.
Figure 5:
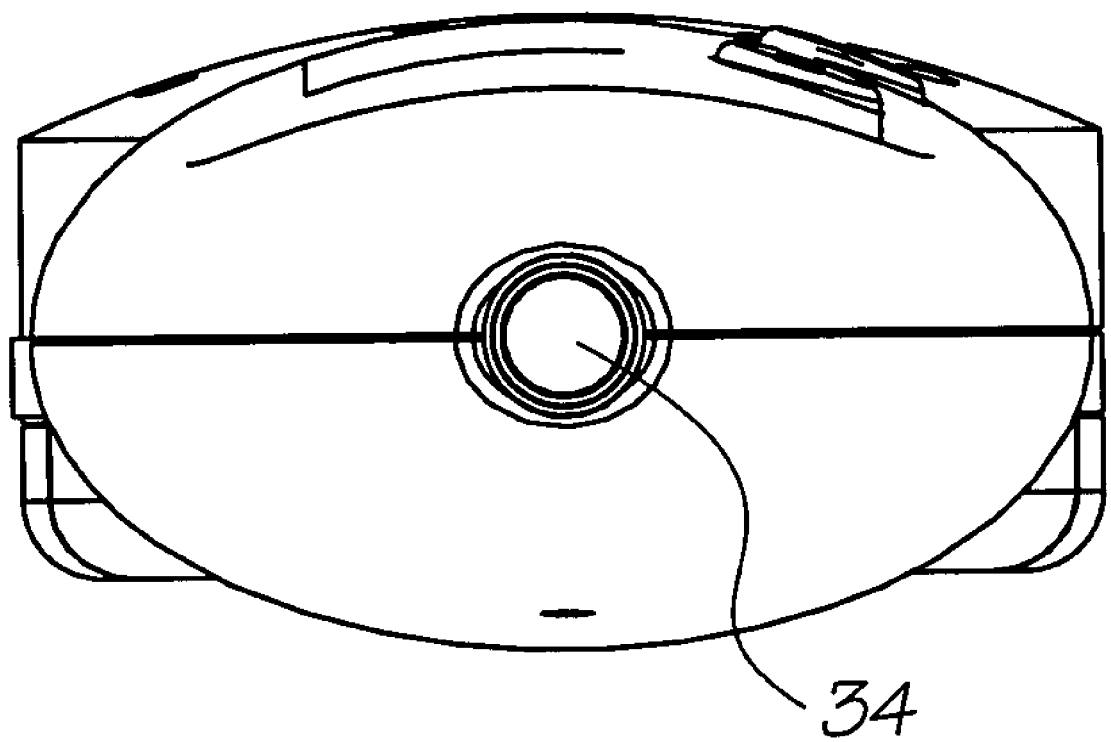
FIG. 5 shows an end view of the audio player.
Figure 6:
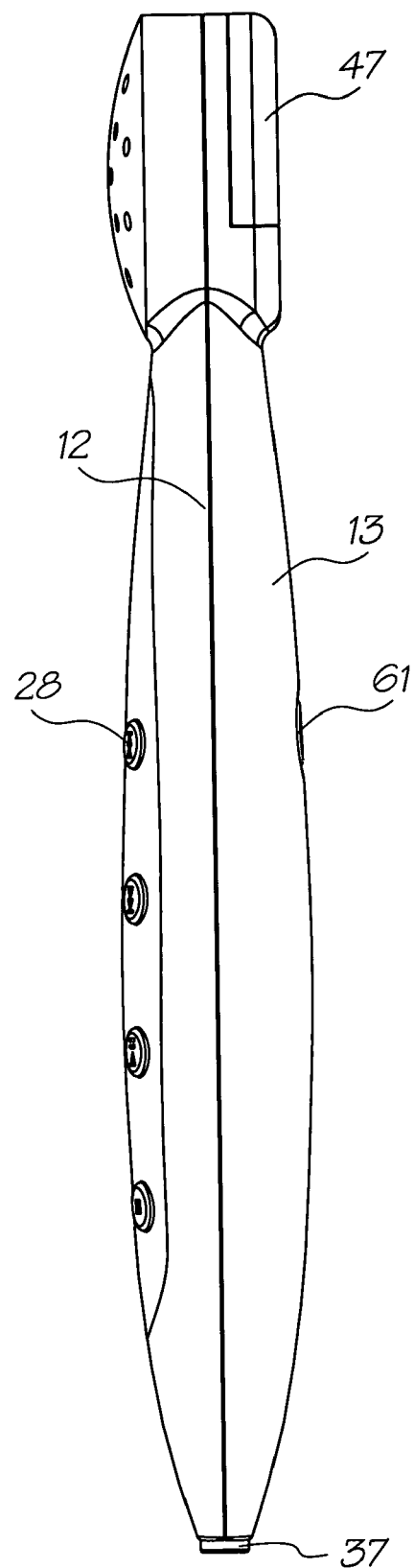
FIG. 6 shows a side view from the right of the audio player.
Figure 7:
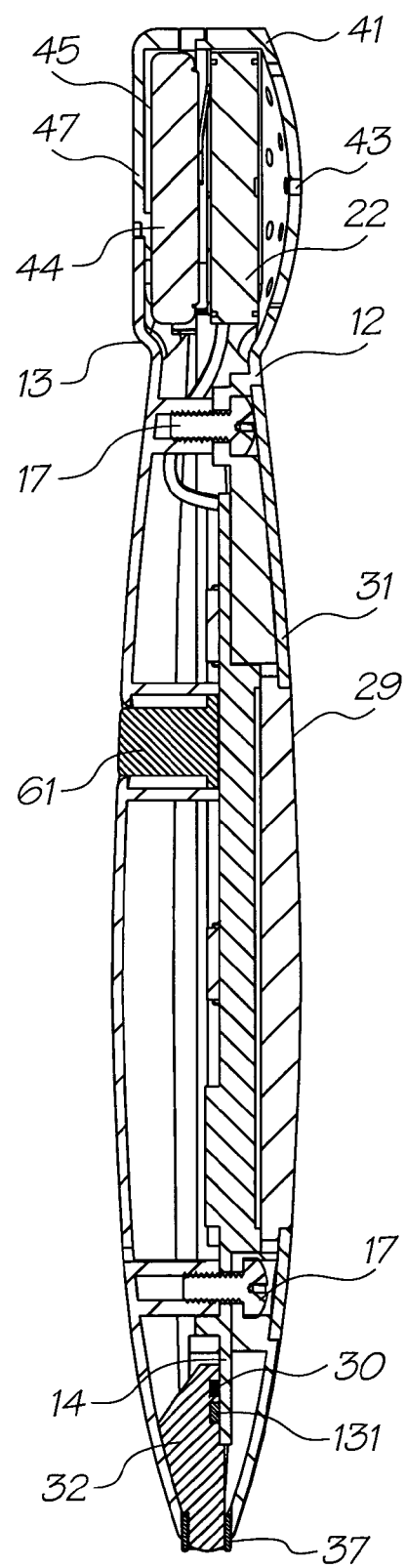
FIG. 7 shows a cross sectional side view of the audio player taken along line AA shown in FIG. 4.
Figure 8:
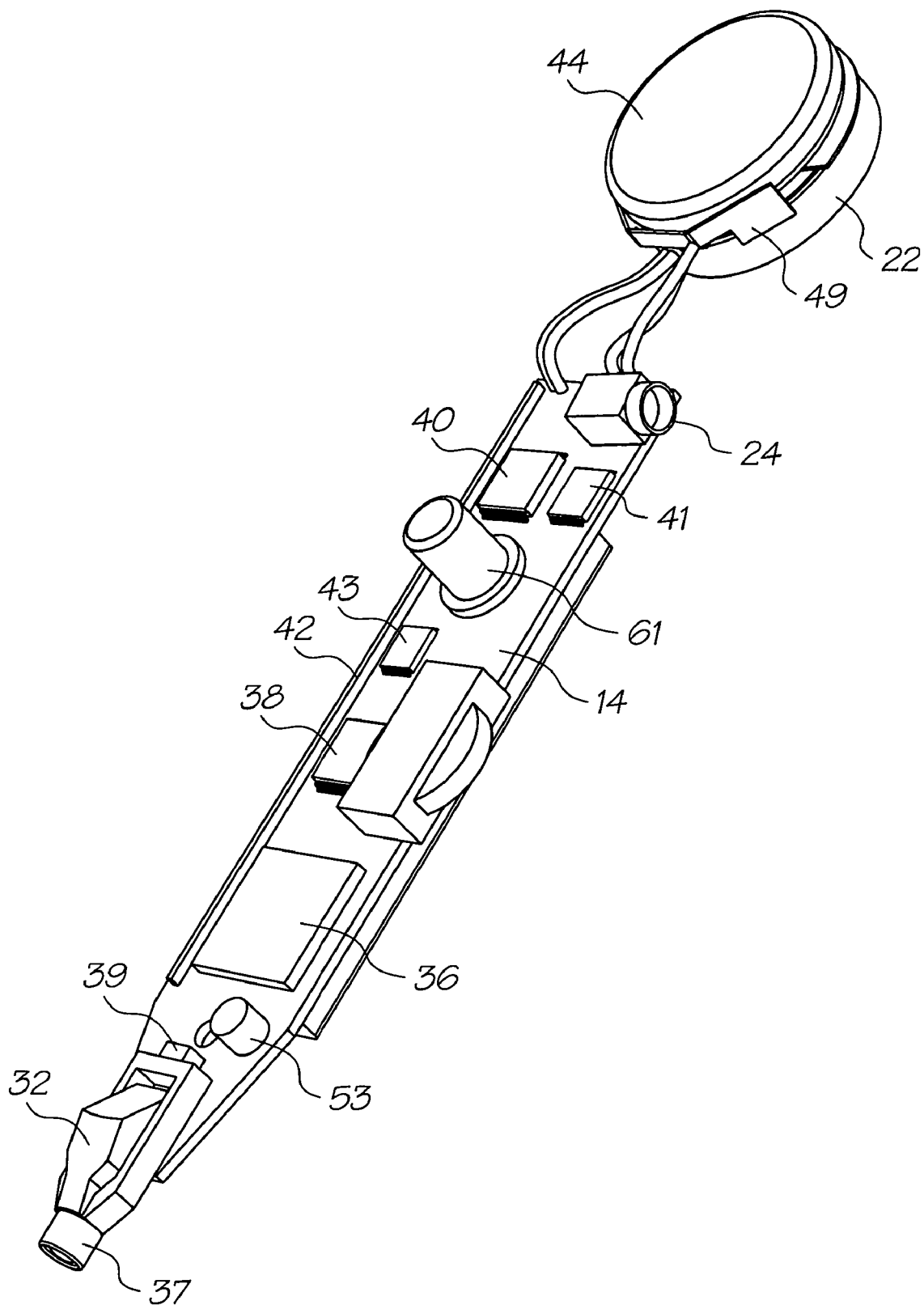
FIG. 8 shows a perspective view from below of the PCB of the audio player.
Figure 9:
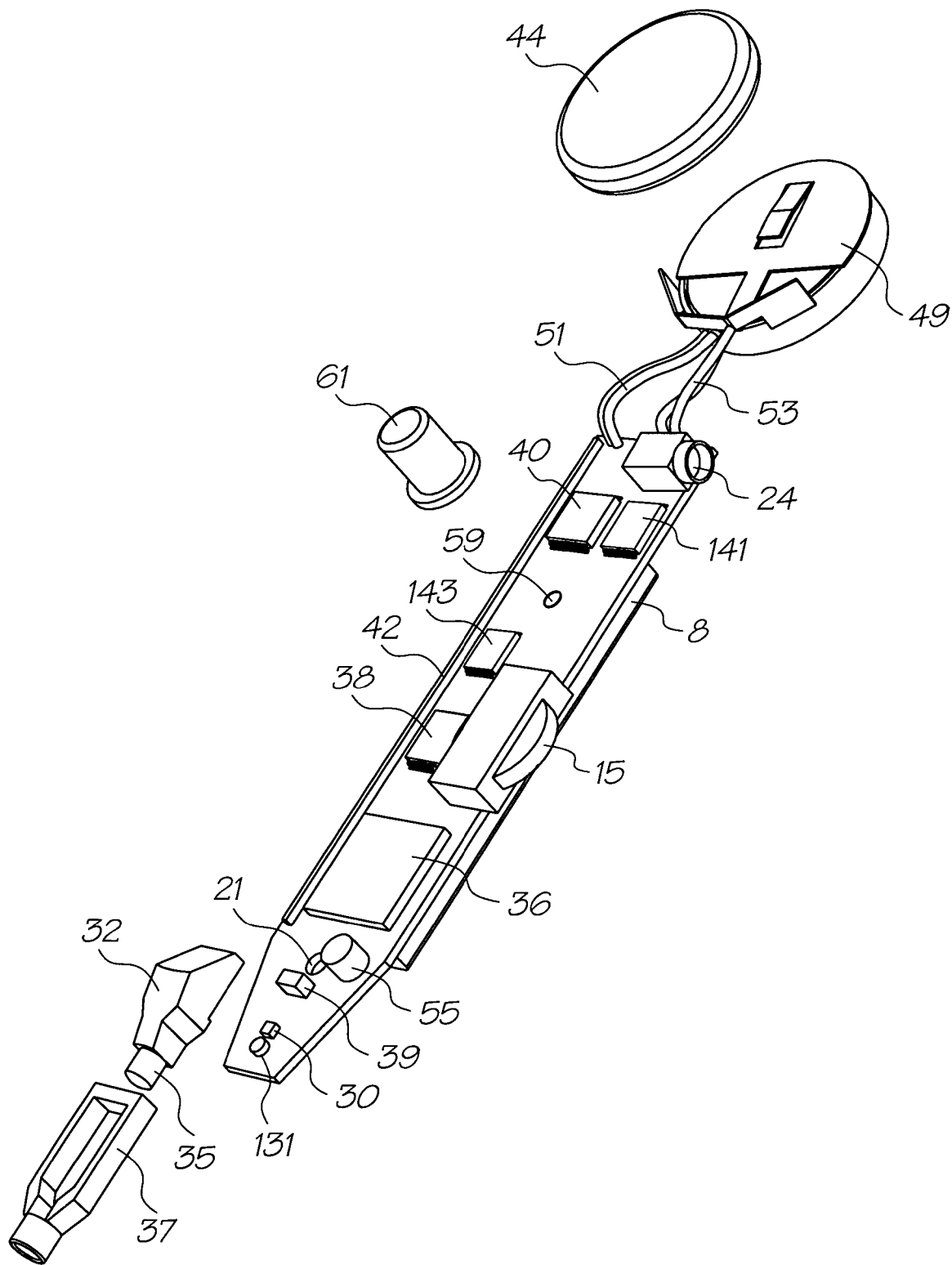
FIG. 9 shows an exploded perspective view from below of the PCB of the audio player.
Figure 10:
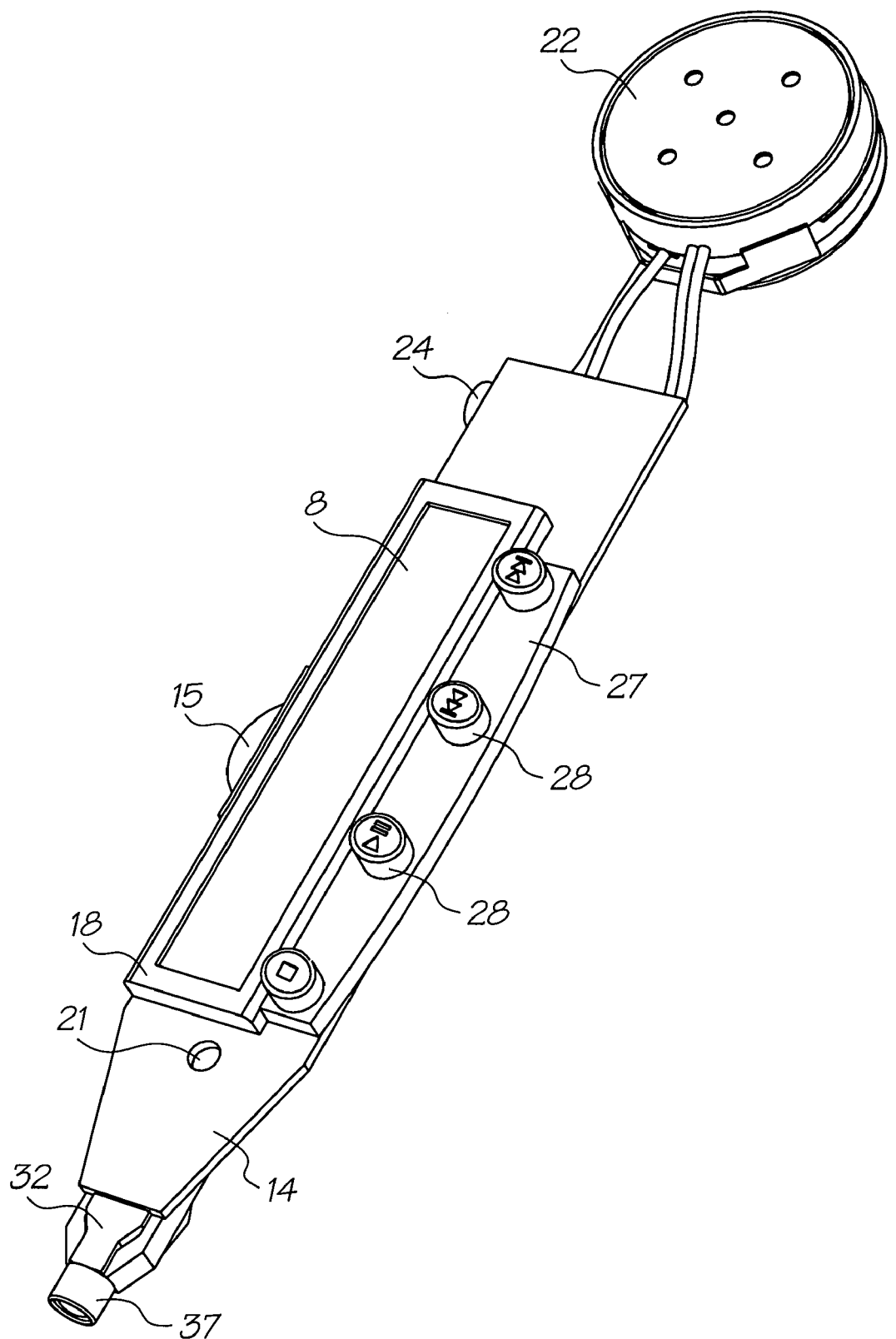
FIG. 10 shows a perspective view from above of the PCB of the audio player.
Figure 11:
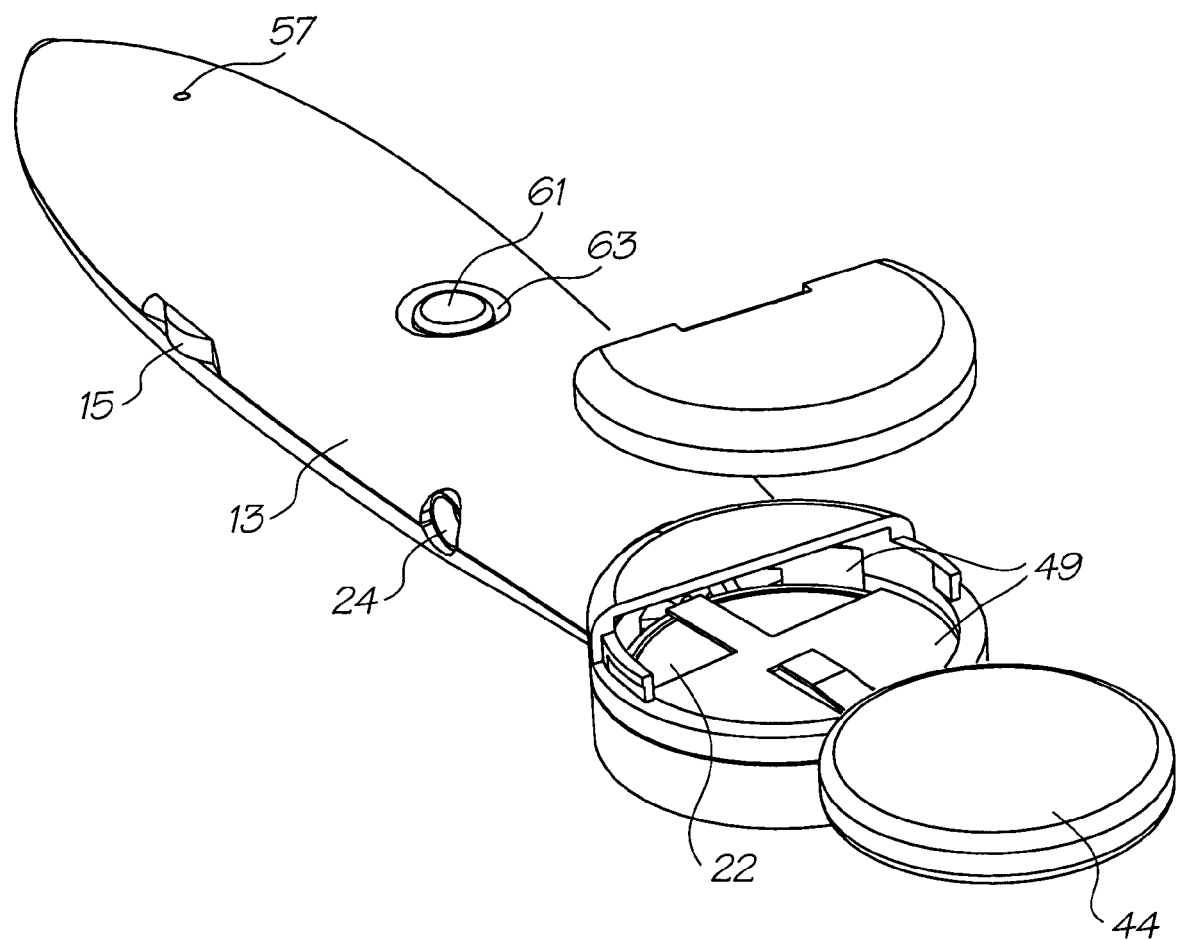
FIG. 11 shows an exploded rear perspective view from above of the audio player.
Figure 12:
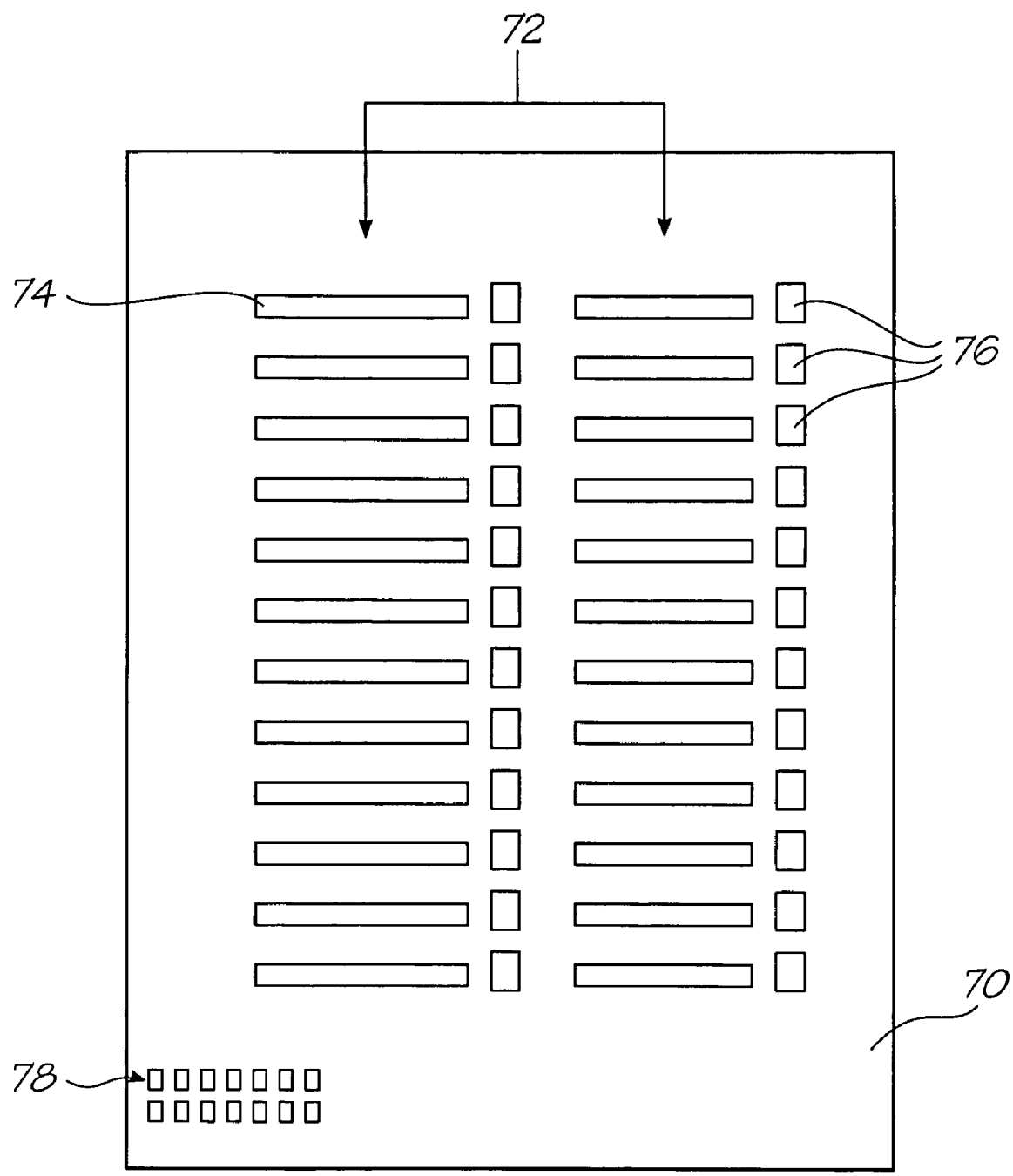
FIG. 12 shows a plan view of a page for use with the first embodiment.
Figure 13:
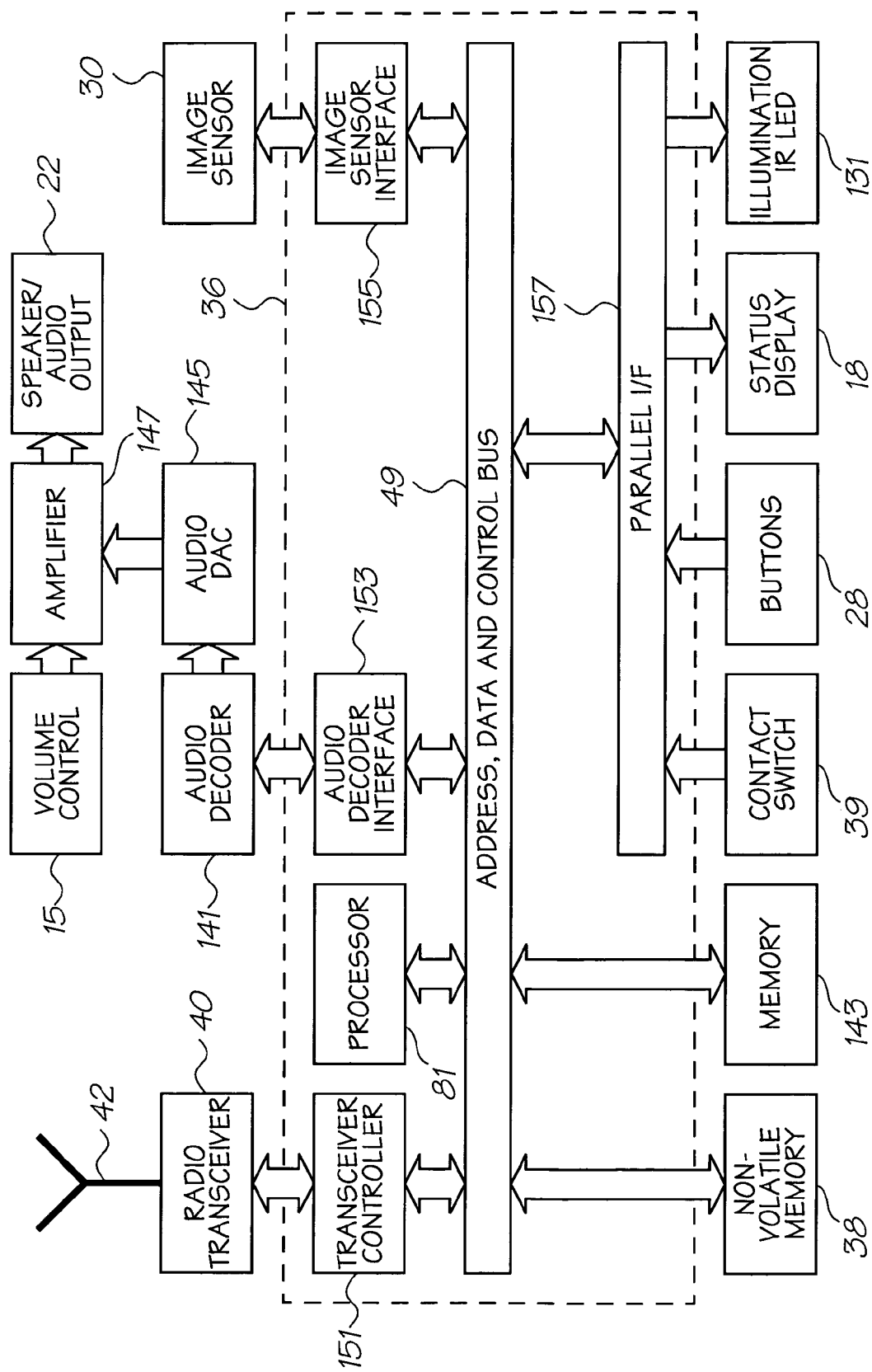
FIG. 13 shows a block diagram of the electronic components of the audio player.

Referring to FIGS. 1 to 11 and 13 there is shown an audio player 10. The audio player has a body formed of upper and lower casings 12 and 13 in which is located a PCB 14. Mounted on the PCB are an optical sensor device 16, an alphanumeric display 18, control switches 20, a volume control 15, a speaker 22 and a headphone jack 24. The upper and lower casings 12 and 13 are held together by screws 17 which pass through openings 19 in the upper casing 12, through an aperture 21 in the PCB 14 and into bosses 23 in the lower casing, so securing the two casings and the PCB together. The upper casing has an aperture 25 into which the display 18 and an elastomeric keypad 27 extend. A transparent window 29 overlays the display 18 and both the window 29 and the keypad 27 are held in position by a top cover 31. The cover 31 has an aperture 26 into which the window 29 extends, so the top surface of the window is flush with the top of the cover 31. The cover 31 also extends over the screws 17. The cover 31 is preferably affixed to the top casing by adhesive but may be a snap fit to the top casing. The keypad buttons 28 extend through corresponding apertures 33 in the cover.

The optical sensor device 16 includes an image sensor 30, infrared LED 131, a light guide 32 and lens 34. The near-infrared LED 131 may be strobed in synchrony with image capture to prevent motion-blurring of captured (tag) images. The image sensor 30 typically consists of a 200×200 pixel CCD or CMOS image sensor with a near-infrared bandpass filter. The light guide 32 and lens 34 may be integrally formed or may be separate components. The lens extends out of the body. The free end portion 35 of the light guide 32 is cylindrical and a force sensor collar 37 is slideably mounted on the cylindrical portion. The collar extends beyond the free end of portion 35 so that when the audio player is pushed against the surface the collar rather than the lens 34 contacts the surface.

The collar 37 extends around and behind the optical device 16 and engages a micro switch 39. The micro switch is biased to an open position; pushing on the collar against the micro switch 39 overcomes the biasing means in the switch 39 and closes it. When the force is removed the biasing means urges the collar outward and opens the switch again. A separate biasing means may be provided external of the switch 39 in addition to the micro switch's own biasing means.

The speaker 22 is located in a circular extension 41 at the top of the body and the top casing 12 is provided with a series of apertures 43 to allow sound to be transmitted by the speaker 22.

The extension 41 also serves as a battery compartment 45 and this is accessed by a cover 47 which clips onto the lower casing 13. Power is supplied to the PCB by a rechargeable or disposable battery 44. The battery 44 is located in the compartment 45 and engages battery contacts 49. The speaker and battery contacts are connected to the PCB by wire sets 51 and 53 respectively.

The PCB includes one or more processor chip 36, a flash memory/buffer 38, a DRAM chip 143, a transceiver chip 40, a compressed audio decoder 141 and an aerial 42. An audio digital to analogue converter 145 and an amplifier 147 are provided but not shown on the PCB.

The processor unit 81 controls and coordinates the various electronic components of the player. The processor executes software which monitors, via the sensor 16, the identity of the underlying page and the position of the player relative to the page; communicates the identity and position data to a netpage base station via the wireless transceiver 40; receives audio clip information and streaming audio data from the base station via the transceiver 40; displays clip information to the display 18; decompresses streaming audio data to the audio output via the audio decoder 145; and interprets user input captured via the user interface buttons 28. The embedded software executed by the processor is stored in the non-volatile memory 38, typically in the form of ROM and/or flash memory. Identity information unique to the player, as well as communications encryption keys, may also be stored in the non-volatile memory. During execution the processor utilizes faster volatile memory, typically in the form of a 64Mbit (8Mbyte) dynamic RAM (DRAM) 143.

Assuming high-quality 12:1 compression of MP3-encoded audio data, the player's memory 143 can hold 9 minutes of stereo audio. With higher compression ratios or more memory, correspondingly longer clips can be held. If streaming playback is used by the player, then only a small audio buffer is required to eliminate transmission jitter, and a significantly smaller memory may be used.

The processor unit 81 communicates with the other components via a shared bus 149. The processor, the bus, and any number of other components may be integrated into a single chip. As indicated in the block diagram, the integrated components may include the digital transceiver controller 151, the audio decoder interface 153, and the tag image sensor interface 155. A parallel interface 157 is interposed between the bus 49 and the buttons 48, display 18, LED 31 and contact switch 39. In a more highly integrated chip, they may also include the audio decoder, the audio DAC, the tag image sensor, and the memory. The analog radio transceiver is unlikely to be integrated in the same chip, but may be integrated in the same package.

Since the player incorporates a dedicated audio decoder 41, the processor only needs to be powerful enough to control and coordinate the other components. Alternatively, the audio decoder may be omitted, and a more powerful processor can used to decode the compressed audio in software.

The transceiver 40 is typically a short-range radio transceiver. It may support any of a number of wireless transmission standards, including Bluetooth/IEEE 802.15, IEEE 802.11, HomeRF/SWAP, HIPERLAN, and OpenAir. Bluetooth/IEEE 802.15, IEEE 802.11-1997, HIPERLAN, OpenAir, and HomeRF/SWAP all support transmission rates in the range of 1 to 2 Mbit/s. IEEE 802.11b supports transmission rates of 5.5 Mbit/s and 11Mbit/s. HIPERLAN also supports a transmission rate of 24Mbit/s in an alternative mode. Beyond these currently-supported wireless LAN (WLAN) standards, next-generation WLAN standards promise to support transmission rates of 100 Mbit/s and beyond.

The player may alternatively be connected to the base station by cable, or may utilize a non-radio-frequency wireless transport, such as infrared. IEEE 802.11, for example, optionally utilizes an infrared transport. IrDA also utilizes an infrared transport.

The player may alternatively or additionally contain a mobile telephone transceiver for longer-range communication with a netpage server via a mobile telephone network. If the transceiver supports a third-generation 'always-on' packet-switched connection, then the player may download or stream audio content at will. If the transceiver only supports a circuit-switched connection, then the player may choose to connect (and potentially stream audio content) only when it encounters a hyperlink.

If the player incorporates a longer-range transceiver, then it may act as a netpage base station for wireless netpage pens and other netpage sensing devices.

Assuming 12:1 MP3 compression, the receiver must support a data rate of 118 Kbit/s. This is clearly well within the minimum capabilities of the various wireless transmission standards described above.

The PCB 14 may also be provided with a microphone 55 on its lower surface and the lower casing 13 is provided with an aperture 57 to allow sound to the microphone. A record switch 59 is provided to activate the microphone 55, also on the lower surface of the PCB. A record button 61 overlays the record switch 59 and is accessible via an aperture 63 in the lower casing. Preferably the button is flush with the outer surface or recessed, so as to prevent accidental activation.

The optical sensor device 16 is a netpage sensor capable of detecting invisible coded tags, as described in our co-pending patent application U.S. Ser. No. 09/721,893. The tags have preferably been printed using infrared absorptive inks. The PCB processor chips 36 includes all of the functional features of a netpage pen as discussed in our co-pending application U.S. Ser. No. 09/721,893 for decoding sensed tags. This decoded data is passed to the transceiver chip 40 for transmittal via aerial 42 to a netpage base station, such as a netpage printer or a netpage-enabled mobile telephone as disclosed in our co-pending application U.S. Ser. No. 09/721,892. Handshake and authentication between the base station and the audio player occurs before this occurs. Again reference is made to application U.S. Ser. No. 09/721,893 for a full explanation.

In the present embodiment of the invention a netpage 70 is provided. This page is tiled with invisible netpage tags 78 over some or all of the surface. For clarity only some tags are shown. The netpage 70 includes a listing 72 of audio files, available for downloading and playing. The files may be music files, speech files or other audio files, such as recordings of animal sounds or any combination of types of recordings. Each entry preferably has a summary of the entry 74 and means for the user to select the entry. This may be a separate selection button 76 or by "hyperlinking" the summary information 74 itself. Hyperlinking may be indicated by underlining of text.

A netpage consists of a printed page (or other surface region) invisibly tagged with references to an online description of the page. The tags may be printed on or into the surface of the page, may be in or on a sub-layer of the page or may be otherwise incorporated into the page. The online page description is maintained persistently by a netpage page server. The page description describes the visible layout and content of the page, including text, graphics and images. It also describes the input elements on the page, including buttons, hyperlinks, and input fields. The page descriptions of different netpages may share components, such as an image, although the netpages (and the associated page descriptions) are visibly different. The page description for each netpage may include references to these common components. A netpage allows markings made with a netpage pen on its surface to be simultaneously captured and processed by the netpage system.

Multiple netpages can share the same page description. However, to allow input through otherwise identical pages to be distinguished, each netpage is assigned a unique page identifier. This page ID has sufficient precision to distinguish between all netpages envisaged to be used in the environment of use. If the environment is small then the precision need not be as great as where the environment is large.

Each reference to the page description is encoded in a printed tag. The tag identifies the unique page on which it appears, and thereby indirectly identifies the page description. In the preferred embodiments the tag also identifies its own position on the page. Characteristics of the tags are described in more detail below.

Tags are printed in infrared-absorptive ink on any substrate which is infrared-reflective, such as ordinary paper. Near-infrared wavelengths are invisible to the human eye but are easily sensed by a solid-state image sensor with an appropriate filter. A sensor sensitive to the relative wavelength or wavelengths may be used, in which case no filters are required. Other wavelengths may be used, with appropriate substrates and sensors.

The user selects an entry by "clicking" on the hyperlink or the selection "button" and the sensor detects the tag(s) 78 in its field of view, decodes the tag(s) and transmits the decoded information to the netpage system via aerial 42. As an alternative to the collar 37, a separate selection button may be provided on the audio player to enable a user to select a link. "Clicking" the audio player against an entry or "button" involves pushing the collar 37 against the page 70 so as to cause the micro switch to close and then releasing the pressure, typically within a preset (small) time period. Whilst the micro switch is closed the image sensor device is activated and attempts to sense one or more of the tags on the page; the sensor is off when the micro switch is open to conserve power.

If the click action fails to successfully acquire and decode a tag image preferably the audio player emits an audible tone or message via the speaker 22.

When a selection has been validly made the audio player may automatically initiate audio download or streaming. Alternatively the audio player may ask for user confirmation, using the display 18 and control buttons 28. An invalid selection may also be notified to the user via the display 18 or via a dedicated LED (not shown). Communication may be via any netpage base station, such as netpage printer, or via a netpage enabled mobile telephone (see co-pending application U.S. Ser. No. 09/721,892. The netpage system determines that the decoded information equates to a request for a particular audio file or files and transmits the file(s) to the audio player 10 via the same or a different path as the request was transmitted.

In the preferred form the audio file or files are downloaded in their entirety and stored in the audio player's memory 38. The audio file may comprise one song or track or multiple songs or tracks. Alternatively a header file may be provided with an index of songs or tracks with each song or track stored in a separate file. Preferably the audio file also includes information which identifies the song or track titles, track numbers, musicians etc. and this information may be displayed on the display 18.

In use, the user may use the control buttons 28 to select any tracks stored in the memory 38. The processor 36 accesses the relevant portion of the memory, extracts the information, converts the (usually) digital format to an analogue format. Audio is routed to the speaker, or, if a plug is present in the stereo headphone socket, to the attached headphones or other external audio device. Audio may also be routed to wireless headphones via the transceiver, either directly from the base station or via the player.

Digital audio is usually sampled at 44.1 kHz, i.e. at twice the 22.05 kHz upper cutoff frequency of the 25th critical band of human hearing. Slightly higher sampling frequencies, such as 48 kHz, are sometimes used because in reality it is impractical to lowpass filter the audio with a sharp cutoff at 22.05 kHz prior to sampling. With typical quantization of 16 bits per channel, a stereo signal therefore generates 1.41 Mbit/s, and this is consequently the data rate of many common digital audio applications, including, for example, the audio compact disc (if error correction overhead is ignored).

Because the typical 1.41 Mbit/s digital audio data rate is non-trivial, there is a strong incentive to compress the digital audio signal. The most successful digital audio compression schemes have a perceptual basis, i.e. they exploit the frequency-dependence of the threshold of human hearing, and signal-dependent masking, whereby a relatively louder tone can locally raise the threshold curve and thus mask relatively softer adjacent tones. Audio compression also typically relies on traditional compression techniques such as entropy-coding. In multi-channel audio, inter-channel redundancy is also commonly exploited. A much fuller discussion of digital audio coding is given in Pohlmann, K. C., *Principles of Digital Audio*, 3rd Edition, McGraw-Hill, 1995, the contents of which are incorporated herein by reference.

The MPEG Audio Layer 3 (MP3) standard uses perceptual coding to achieve 'near-CD' and 'CD' quality reproduction at compression ratios of between 16:1 and 12:1, i.e. reducing the data rate from 1.41 Mbit/s to between 88 kbit/s and 118 Kbit/s.

Audio files may be compressed to reduce their size. Any compression algorithm may be used; however, the MP3 compression algorithm is, currently, an effective industry standard and so MP3 compression is used to enable maximum compatibility. A dedicated MP3 decoder 41 is provided for this purpose, the audio decoder 41 may be an STMicroelectronics STA013 decoder (STMicroelectronics, *STA013 MPEG2.5 Layer III Source Decoder*,). The STA013 accepts streaming data via a serial interface and is controlled via an I2C interface. Any of a number of other audio encoding standards may be supported via suitable audio decoders, including Dolby AC-3, and RealNetworks' RealAudio. The processor chip 36 may provide MP3 decoding by use of software decoding or hardware decoding. Other decoding schemes may be incorporated in the audio player together with or instead of MP3 decoding. These may be implemented in hardware or software.

The internal memory 38 is preferably 8 MB in size, enough storage for approximately 9 minutes average MP3 files. Additional storage may be provided using user replaceable memory, preferably non volatile solid state memory. Audio files may be downloaded to such user replaceable memory via the audio player 10 or via a user's personal computer. Where user replaceable memory is provided, the memory 38 provided for storage of audio files may also be implemented in user replaceable form, i.e. the audio player itself typically will have no permanent memory for storage of audio files.

In the preferred implementation the audio player downloads audio files, stores the file in memory and then plays the tracks under user control. Where the files are of significant size, downloading the entire file may take some time and so "streaming" may be implemented. In "streaming" the audio file is played as it is received, rather than once it has been fully downloaded. A file played via "streaming" may still be stored in the memory 38 for later playback.

The audio player optionally includes a microphone and a record button. It can then be used to record speech input, thus providing another kind of netpage input. Recorded speech input may, for example, be associated with a location on a netpage, in the form of an annotation, by clicking at the location with the audio player. Subsequent clicks at the same location using an audio player then cause the audio annotation to be played back. If the surfaces of physical objects are universally netpage-enabled, i.e. tagged with unique netpage tags, then audio annotations can be placed almost anywhere. Such audio annotations may be private or public. When they are private they may only be played back by their author. When they are public they may be played back by anyone.

When incorporating a microphone, the audio player can be configured to act as a wireless telephone under the control of a telephony application. Since the player lacks a user interface for dialing numbers, numbers can be selected from a netpage in the manner described in our co-pending application U.S. Ser. No. 09/721,895.

An audio clip may be associated with a netpage in the form of a hyperlink, in which case activation of the hyperlink by the audio player is ultimately handled by an application whose responsibility it becomes to provide the audio clip to the player. An audio clip may also be logically embedded as an audio clip object in a page description, in which case clip activation is ultimately handled by the page server which holds the page description. Any click in the zone of the audio clip object is interpreted by the page server as audio clip activation. In either case the actual audio clip may be stored on a separate remote server, which may become involved in the streaming playback or download of the audio clip.

The audio player can download an audio clip activated by the user into its internal memory before making it available for playback, or it can stream the audio clip on demand from the remote server in response to the user interacting with the player's playback controls.

Some of the audio files downloaded will be commercially produced songs for which the copyright owners require payment. Since the netpage system incorporates owner and device authentication, providing payment is relatively simple.

Audio files may be downloaded upon payment for a limited or infinite number of playbacks. Where the audio file is limited to a set number of playbacks the file may include a counter which is decremented after each playback. One-time "playback" may be implemented by streaming, with code to prevent recording of the file or by use of a counter with an initial value of 1. To prevent piracy, particularly where removable memory is used, the audio file stored may be modified to include the netpage ID of the audio player 10 to which it was originally downloaded. Playback may be limited to that particular audio player or to playback devices owned by the owner of the original audio player. This second option may require interaction with the netpage system for authentication.

Payment for each playback may also be implemented each time the file is played, rather than by way of a single payment. In this scenario, when the file is played, the audio player transmits information to that effect to the netpage system for debiting of the user's account. Authentication from the netpage system after debiting has occurred may be required before the audio player commences playback.

The player typically incorporates power management. After a period of inactivity the player may inactivate the status display. After a longer period of inactivity the processor may enter a power-conserving quiescent state. Power management may be coupled with the tag sensor micro-switch, allowing wake-up on page interaction. The player may also incorporate an accelerometer for this purpose.

Whilst the invention has been described with reference to the netpage system which uses invisible tags, the invention is not limited to the netpage system or the use of invisible tags. If desired, the invention may utilize tags or codes which are visible to the average unaided human eye, such as bar codes. The tags need not merely encode an identity which is then used to look up the relevant files. The tags may encode instructions at a higher level. For example a tag may encode an instruction of "play the track entitled X by the artist Y". If invisible tags are used they need not be limited to the tags disclosed in relation to the netpage system. Other tagging systems are available and any suitable tagging system may be used. The invention is not limited to the use of inks which absorb certain wavelengths or fluoresce certain wavelengths. Magnetic inks, surface modification, including apertures, modification of the structure of the substrate itself all fall within the scope of the invention. The systems and methods to link the audio player of the present invention and the source of the audio files are not limited to netpage systems. An audio player may be linked by a cable to a single computer, rather than a network of computers.

The present invention has been described with reference to a preferred embodiment and number of specific alternative embodiments. However, it will be appreciated by those skilled in the relevant fields that a number of other embodiments, differing from those specifically described, will also fall within the spirit and scope of the present invention. Accordingly, it will be understood that the invention is not intended to be limited to the specific embodiments described in the present specification, including documents incorporated by cross-reference as appropriate. The scope of the invention is only limited by the attached claims.

The invention claimed is:

1. An MP3 player including:
   at least a fixed memory for storing received audio data;
   at least one sensor for sensing coded data on or in a substrate and for generating first data, the substrate being entirely tiled with the plurality of coded data tags;
   a transmitter for transmitting, to a computer system, said first data or second data at least partially based on said first data;
   a receiver for receiving, from the computer system, MP3 data associated with an identity derived from the first data; and
   at least one audio output device for outputting an audio signal based on the received MP3 data, wherein the audio player has an identity and further includes processor means to store the identity or data indicative of the identity with or in audio data stored in memory by modification of the audio file stored to include a unique identifier associated with said audio player, wherein playback of said files is limited to the original audio player or audio players owned by the same owners;

wherein the coded data comprises of a plurality of coded data tags, each coded data tag including data regarding an identity of the substrate and a position of the respective coded data tag on the substrate, wherein the at least one sensor senses at least one of the coded data tags and generates the first or second data representing the identity of the substrate and a position of the sensed coded data tag on the substrate, wherein the first or second data are transferred by the transmitter to the computer system to enable retrieval of the audio data using the first or second data.

2. The MP3 player according to claim 1, wherein the at least one sensor is configured to sense the coded data on or in the substrate during movement of the MP3 player relative to the substrate.

3. The MP3 player according to claim 1, wherein the plurality of coded data tags are invisible in the visible spectrum, wherein the at least one sensor is configured to sense the coded data.

4. The MP3 player according to claim 1, wherein the MP3 player includes a microphone configured to receive audio signals, wherein the MP3 player is configured to record the received audio signals in memory.

5. The MP3 player according, to claim 4, wherein the MP3 player records an association between coded data sensed using the at least one sensor the coded substrate and the audio signals received by the microphone, wherein upon subsequent use of the at least one sensor to sense the coded data results in the MP3 player to use the recorded association to retrieve the audio signals and use the audio output device for outputting the retrieved audio signal.

6. The MP3 player according to claim 1, wherein the substrate includes information which is visible in the visible spectrum such that at least some of the coded data and the information is coincident upon the substrate.

7. The MP3 player according to claim 1, wherein the sensor is provided in the form of a pen, wherein the pen is configured to simultaneously mark the substrate and sense at least some of the coded data when placed in an operative position relative to the substrate.

8. The MP3 player according to claim 1, wherein the sensor includes a slidable collar operatively connected to a switch, wherein when the sensor is forced against the substrate in an operative position, the collar slidably moves to actuate the switch, wherein the switch actuates the sensor to sense coded data whilst the sensor is forced against the substrate.

9. The MP3 player according to claim 8, wherein the slidable collar is biased toward a first position wherein the switch is in an inactive sate, and wherein when the slidable collar is force against the substrate, the slidable collar moves to a second position causing the switch to be actuated to an active state thereby actuating the sensor to sense coded data for the period of time, and wherein when force is removed from the slidable collar the slidable collar returns to the first position thereby causing the switch to actuated to the inactive state.

10. The MP3 player according to claim 1, wherein in the event that the at least one sensor fails to capture at least one of the coded data tags, the MP3 player is configured to indicate to the user that the coded data was unsuccessfully sensed.

11. The MP3 player according to claim 10 wherein the MP3 player is configured to emit an audio tone to indicate that the coded data was unsuccessfully sensed.

12. The MP3 player according to claim 1, wherein the MP3 player is a wireless telephone.

13. The MP3 player according to claim 1, wherein upon playback of the audio file using the MP3 player, the MP3 player is configured to transmit, to a server processing system, account data indicative a user's account for debiting in response to playing the audio file.

14. The MP3 player according to claim 1, wherein the sensor includes an accelerometer, wherein when the sensor is moved, the accelerometer senses the movement of the sensor and actuates the sensor to sense at least some of the coded data.

* * * * *

UNITED STATES PATENT AND TRADEMARK OFFICE
CERTIFICATE OF CORRECTION

PATENT NO. : 7,400,937 B2 Page 1 of 1
APPLICATION NO. : 10/917467
DATED : July 15, 2008
INVENTOR(S) : Paul Lapstun et al.

It is certified that error appears in the above-identified patent and that said Letters Patent is hereby corrected as shown below:

Column 11, line 33 (Claim 5), should read:
--using the at least one sensor from the coded substrate and the audio--;

Column 12, line 14 and 15 (Claim 9), should read:
--is in an inactive state, and wherein when the slidable collar is
forced against the substrate, the slidable collar moves to a--.

Signed and Sealed this

Twenty-first Day of April, 2009

JOHN DOLL
*Acting Director of the United States Patent and Trademark Office*